US006898047B2

(12) United States Patent
Shishida et al.

(10) Patent No.: US 6,898,047 B2
(45) Date of Patent: May 24, 2005

(54) MAGNETIC DISK DRIVE FOR COMPENSATING REPEATABLE RUNOUT ERROR

(75) Inventors: Kazuhisa Shishida, Odawara (JP); Yosuke Seo, Sagamihara (JP); Takahiro Inoue, Odawara (JP); Makoto Horisaki, Odawara (JP); Youichi Kusagaya, Mishima (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 506 days.

(21) Appl. No.: 09/928,415

(22) Filed: Aug. 14, 2001

(65) Prior Publication Data

US 2003/0002200 A1 Jan. 2, 2003

(30) Foreign Application Priority Data

Jun. 28, 2001 (JP) ........................ 2001-195693

(51) Int. Cl.[7] ............... G11B 5/596; G11B 19/04
(52) U.S. Cl. ........................ 360/77.04; 360/60
(58) Field of Search .............. 360/60, 77.08, 360/77.04

(56) References Cited

U.S. PATENT DOCUMENTS 5,825,578 A   10/1998  Shrinkle et al. ......... 360/77.08
6,049,440 A    4/2000  Shu ..................... 360/77.04
6,310,742 B1 * 10/2001  Nazarian et al. ........ 360/77.04
6,545,835 B1 *  4/2003  Codilian et al. ........ 360/77.04
6,549,362 B1 *  4/2003  Melrose et al. ......... 360/77.04
2001/0030828 A1 * 10/2001  Takaishi ................ 360/78.14
2002/0039248 A1 *  4/2002  Liu ..................... 360/77.04
2002/0109932 A1 *  8/2002  Aikawa et al. .......... 360/77.04
2003/0218814 A9 * 11/2003  Min et al. .............. 360/31

FOREIGN PATENT DOCUMENTS

JP    9-282820   10/1997
WO   00-16332    3/2000

* cited by examiner

Primary Examiner—Andrew L. Sniezek
(74) Attorney, Agent, or Firm—Mattingly, Stanger, Malur & Brundidge, P.C.

(57) ABSTRACT

In order to achieve narrow track pitch by measuring, storing and compensating common average values for repeatable runout components between adjacent tracks in a head positioning control system for a magnetic disk drive, a compensation signal is calculated for the average value of the repeatable runout of each servo sector of at least two tracks of servo information reproduced from a magnetic disk, on the basis of an inverse function of the sensitivity characteristics of the tracking control system. The compensation signal is stored, and thereafter used for compensating the servo signal.

3 Claims, 7 Drawing Sheets

- 302 DATA STORAGE AREA
- 303 REPEATABLE RUNOUT COMPENSATION AREA (0)
- 101 MAGNETIC DISK
- 304 REPEATABLE RUNOUT COMPENSATION AREA (1)

FIG.4

- 116 POSITION ERROR SIGNAL
- 110 SERVO INFORMATION
- 401 DRIVE SYSTEM AND MAGNETIC HEAD SUPPORT SYSTEM Gp(z)
- 117 SERVO CONTROL SIGNAL
- 106 ADDER
- 118 ADDER
- 105 COMPENSATOR Gc(z)
- 111 MASTER CONTROLLER
- 109 REPEATABLE RUNOUT AVERAGE VALUE COMPENSATION SIGNAL RRO COMP [m] [n] [i]
- 107 REPEATABLE RUNOUT AVERAGE VALUE COMPENSATOR
- 108 SERVO SIGNAL

MAGNETIC DISK DRIVE FOR COMPENSATING REPEATABLE RUNOUT ERROR

BACKGROUND OF THE INVENTION

1. Field of the Invention

The present invention relates to magnetic head positioning means for a magnetic disk drive, and more particularly, to magnetic head positioning means for a sector servo system magnetic disk drive wherein servo information is recorded on a magnetic disk before being incorporated into a magnetic disk drive.

2. Description of the Related Art

Conventionally, servo information is stored onto a magnetic disk after the magnetic disk has been installed in a magnetic disk drive. Accordingly, there has been a requirement for magnetic disk drives to have a function for performing high-precision servo information recording, in order to meet demands for narrowing of servo tracks. As a result, it is necessary to provide a high-precision positioning mechanism and hence the magnetic disk drive becomes expensive.

On the other hand, one technique for improving positioning characteristics in order to achieve narrowing of servo tracks is a system as disclosed in Japanese Patent Laid-open No.(Hei)9-282820 which compensates for the repeatable runout components in the servo signal which are generated when servo information is written to a magnetic disk. In this conventional compensating system, the repeatable runout components are measured and compensated for.

However, in order to counteract repeatable runout components caused by the excitation of the spindle motor which rotates the magnetic disk, or by deformation of the magnetic disk, these components being particularly notable when servo information is recorded onto the magnetic disk by means of this system before installing the disk in a magnetic disk drive, a large memory space is required because of the need to store compensation values for a large number of tracks.

SUMMARY OF THE INVENTION

The system which measures and stores repeatable runout components for each servo sector as disclosed in the prior art is not desirable with regard to achieving an inexpensive magnetic disk drive, since it requires a large memory volume to store the information used in compensating the repeatable runout components across all servo tracks.

It is also possible to conceive of a system wherein specific track data is stored in order to restrict the memory volume used to store the repeatable runout compensation values, but this is not desirable from the viewpoint of improving location accuracy, as the repeatable runout components generally vary between different tracks.

Therefore, the present invention provides a magnetic disk drive having means for positioning a magnetic head in a highly accurate manner, by compensating for the average value of repeatable runout components which are particularly notable when servo information is recorded to a magnetic disk before the disk is installed in a magnetic disk drive.

In order to resolve the aforementioned problem, the present invention is a magnetic disk drive comprising means for measuring the average value of the repeatable runout components for each servo sector across at least two or more tracks, and means for removing repeatable runout components from the servo information on the basis of this measurement value, or means for adjusting the slice level used to judge when to halt data recording, if there is a large error in positioning during data recording.

DESCRIPTION OF THE PREFERRED EMBODIMENTS

Figure 1:
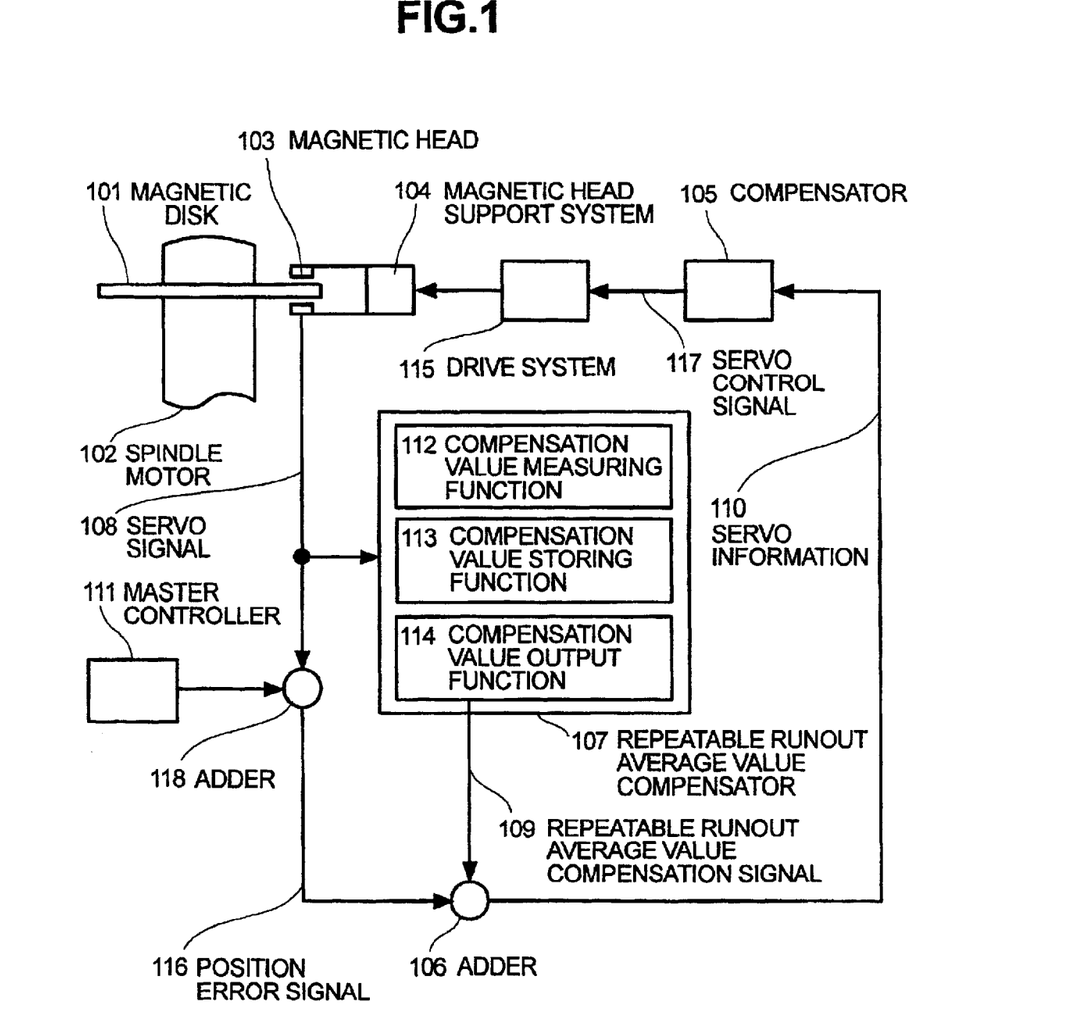
FIG. 1 is a diagram showing one embodiment of the present invention.

FIG. 1 shows one embodiment of the present invention. An overview of the present invention is described on the basis of FIG. 1. A magnetic disk 101 storing servo information and data is attached to a spindle motor 102 and incorporated into a magnetic disk drive. A servo pattern (not illustrated) is recorded onto the magnetic disk 101 by means of servo pattern recording apparatus (not illustrated) prior to attaching the magnetic disk 101 onto the spindle motor 102.

A servo signal 108 is obtained as a result of the servo pattern recorded on the magnetic disk 101 being read out by means of a magnetic head 103. Here, the servo signal 108 comprises positional information indicating the position of the magnetic head 103 over the magnetic disk 101. In other words, it is constituted by a grey code indicating the number of a "track", tracks being concentrically shaped regions on the magnetic disk 101 having an approximately uniform width in the radial direction (integers being assigned consecutively from the outer circumference to the inner circumference of the magnetic disk 101 as a track number for a radially consecutive plurality of tracks), and a position error signal indicating deviation from the centre of the track.

A positional error signal 116 obtained by means of an adder 118 differentiating the position information obtained from the servo signal 108, from the target position information indicated by a master controller 111, is added by an adder 106 to a repeatable runout average value compensation signal 109 previously measured and recorded by a repeatable runout average value compensator 107. The servo information 110 thus obtained is input to the compensator 105. The compensator 105 derives a servo control signal 117 and locates the magnetic head 103 in the target position instructed by the master controller 111 of the magnetic disk 101, by driving a magnetic head support system 104 via a drive system 115. Positioning means is constituted jointly by the compensator 105, drive system 115 and magnetic head support system 104.

The present embodiment discloses a system for adding a repeatable runout average value compensation signal 109 to a position error signal 116, but in a digital control system where the servo signal forming the main signal of the magnetic disk servo system is handled as digital information in the processor, the present invention can be implemented readily by means of composition wherein a repeatable runout average value compensation value 109 is added to the servo signal.

Next, the operation of the repeatable runout average value compensator 107 is described. This repeatable runout average value compensator 107 is constituted by a compensation value measuring function 112, a compensation value recording function 113 and a compensation value output function 114. The compensation value measuring function 112 operates according to the flowchart shown in FIG. 2, on the basis of a repeatable runout average value compensation value measurement operation instruction from the master controller. Here, in the processing for deducing a repeatable runout average value compensation value according to the flowchart in FIG. 2, the repeatable runout average value compensation signal 109 in FIG. 1 is set to zero.

Figure 2:
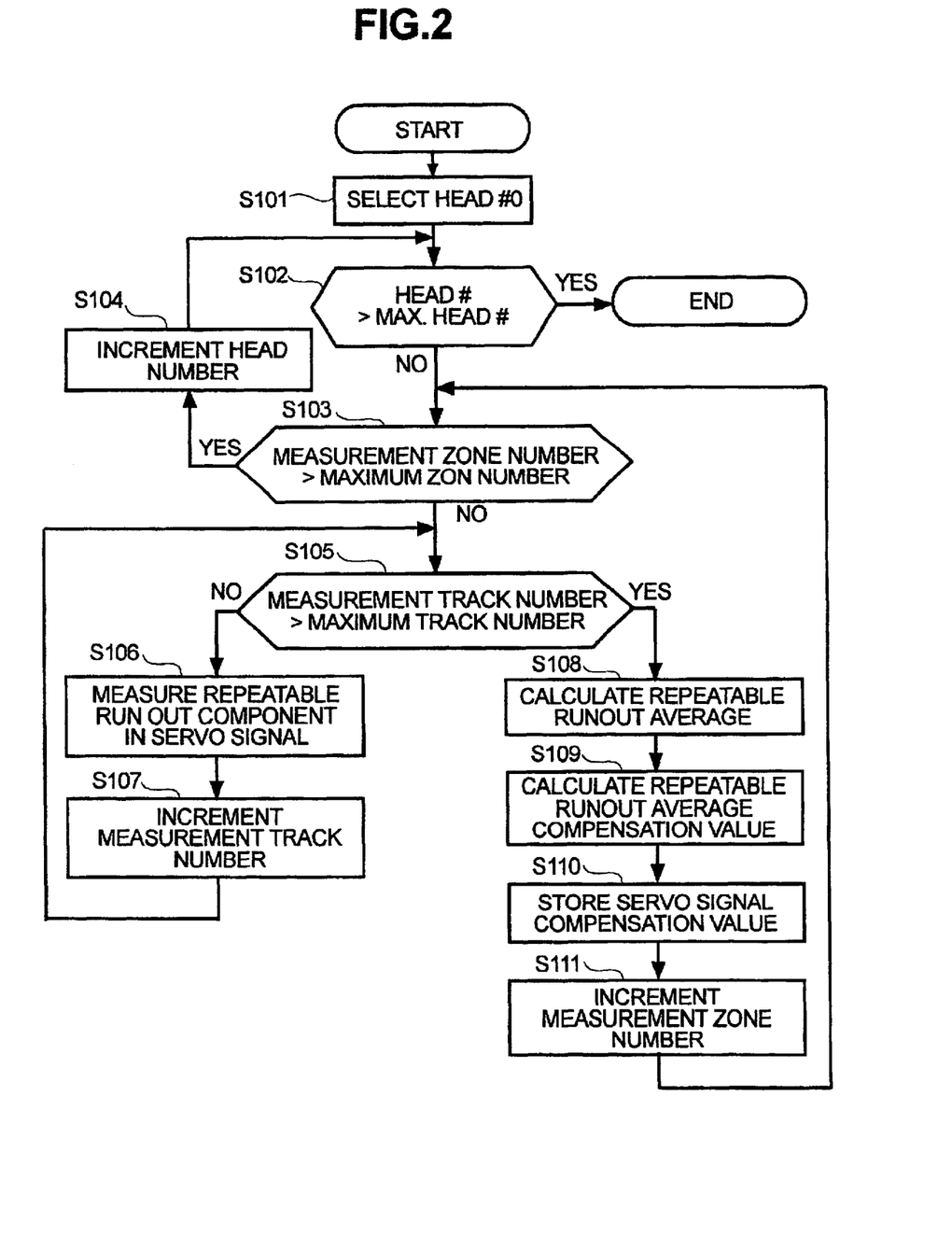
FIG. 2 is an algorithm for measuring a compensation value for the average value of repeatable runout according to the present invention.

Firstly, head #0 is selected (s101). The sequence then moves to a process for determining whether the selected head is lower than the maximum head number (s102). If the selected head number is greater than the maximum head number at this head number judgement process (s102), in other words, if compensation value measurement has been completed for all the heads, then the compensation value measuring function 112 terminates. If, on the other hand, the selected head number is equal to or less than the maximum head number, in other words, if measurement has not been completed for all the heads, then the sequence transfers to a process for determining whether the compensation value measurement zone is smaller than the maximum measurement zone (s103).

Figure 3:
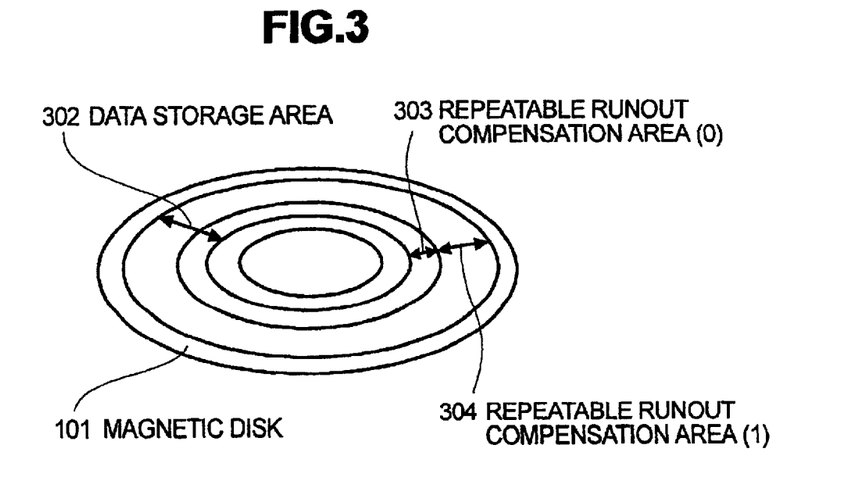
FIG. 3 is an explanatory diagram of a measurement zone for the compensation value for the average value of repeatable runout according to the present invention.

Here, a "compensation value measurement zone", as illustrated in FIG. 3, corresponds to a repeatable runout compensation area (303, 304) obtained by dividing the data storage area 302 of the magnetic disk 101 in the radial direction thereof. If the measurement zone is judged to be greater than the maximum zone as a result of the judgement process at s103, then the sequence shifts to a process for incrementing the measurement head number (s104), and then branches to the head number judgement process at s102. If, on the other hand, the measurement zone number is equal to or less than the maximum zone number, then the sequence shifts to a process (S105) for determining whether the measurement track number (number of tracks) is less than the maximum track number (number of tracks) in that measurement zone.

Here, when the repeatable runout average value compensation value measurement operation instruction is given by the master controller, the measurement zone number where measurement is to be started is determined as an initial setting, similarly to the head at S101, and the head is moved to the determined measurement zone. It is then possible to measure a prescribed number of zones by setting the measurement zone number at which measurement will terminate to the maximum zone number.

If the measurement track number is greater than the maximum track number (number of tracks) in that measurement zone (where number of measurement tracks in the zone is taken as n), then the average value of the measured repeatable runout for the n tracks is calculated (s108). A compensation value for this repeatable runout average value is then calculated by means of a method described hereinafter (s109). Subsequently, this calculation result is stored in a non-volatile storage area by means of the compensation value storing function 113 (s110). Here, this non-volatile storage area is taken to be a memory such as an EPROM mounted on a circuit board (not illustrated), or a storage area of the magnetic disk 101. When the process of storing the compensation value in the non-volatile memory (s110) has been completed, the measurement zone number is incremented (s111), and the sequence branches to the process for determining whether the measurement zone number is equal to or less than the maximum zone number (s103).

If, on the other hand, the measurement track number (number of tracks) is equal to or less than the maximum track number (number of tracks=n), then the sequence branches to a process (s106) for measuring the repeatable runout component for each servo sector (servo pattern storage regions distributed in approximately equilateral fashion within tracks) from the position error signal 116 obtained by differentiating the position information derived from the servo signal 108, from the target position information instructed by the master controller 111.

The repeatable runout components are derived by storing the aforementioned position error signal 116 in the memory for each m cycles, and averaging same for each servo sector. The aforementioned position error signal 116 is defined as PES[i][r] (where i: servo sector number 1~sect; r: measurement frequency 1~m). In this case, the repeatable runout component RRO[i] (repeatable runout component for servo sector number i) is given by $$RRO[i]=(1/m)(PES[i][1]+PES[i][2]+\ldots+PES[i][m]) \quad \text{(equation 1)}$$

When the process for measuring the repeatable runout components (s106) in the track in question has been completed, the measurement track number (number of tracks) is incremented (s107), and the sequence transfers to the process for determining whether the measurement track number (number of tracks) is equal to or less than the maximum track number (number of tracks) (s105).

Here, similarly to the measurement zone number described above, a track number for starting measurement is previously stipulated, and the head is moved to the corresponding track. It is possible to measure compensation values for a prescribed number of tracks by stipulating the track number where measurement is to terminate as the maximum track number.

Whilst it is necessary to perform measurement for all of the heads, it is not required to measure compensation values for all zones or, in particular, all tracks. It is possible to achieve the effects of the present invention provided that compensation values are measured for at least a plurality of tracks in one zone.

Next, the method for calculating repeatable runout compensation values will be described.

Figure 4:
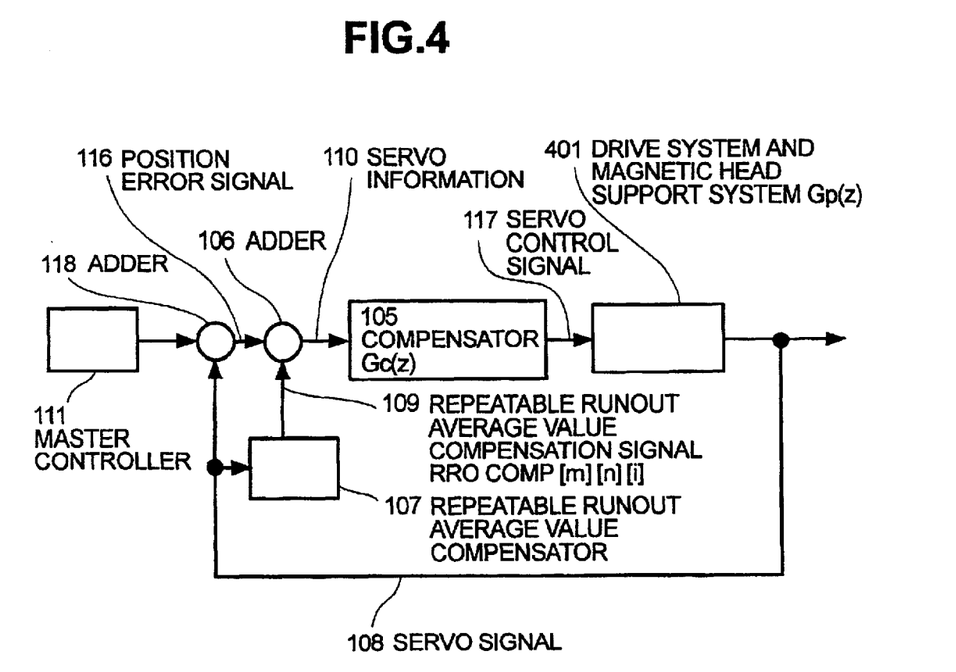
FIG. 4 is a block diagram of tracking control system for recording or reproducing data according to the present invention.

FIG. 4 illustrates the system in FIG. 1 by converting same to a generally known format, called a block diagram. Firstly, the target position information instructed by the master controller 111 and the servo information 108 are added together by the adder 118. Thereupon, the adder 106 adds the repeatable runout average value compensation signal 109 read out from the repeatable runout average value compensator 107 to the position error signal 116 output by the adder 118. On the basis of the output from this adder 106, namely, the servo information 110, the compensator 105 (having transmission characteristics of Gc(z)) calculates a servo control signal 117 and implements positional control of the magnetic head support system by means of the drive system 115 (the transmission characteristics of the drive system and the head support system being taken as Gp(z) and being represented by a single block 401). Here, z indicates a well-known z transform operator.

Here, the servo sector number is taken as sect, the number of heads is taken as hd, the number of measurement zones is taken as zone, and the number of measurement tracks in each measurement zone is taken as track. The repeatable runout component for the (i)th servo sector (i=1~sect) of the (j)th track (j=1~track) of the nth zone (n=1~zone) of the (m)th head (m=0~hd- 1) is determined as RRO[m][n][i][j] by the processing at s106. Here, the repeatable runout average value compensation signal RRO_COMP [m][n][i] is not added to the position error signal 116 used when calculating the repeatable runout components. When measurement of the repeatable runout for the number of measurement tracks has been completed for a particular measurement zone, the average thereof RRO_AVG is calculated (equation 2).

$$RRO\_AVG[m][n][i] = (1/\text{track}) \times \{RRO[m][n][i][1] + \ldots + RRO[m][n][i][\text{track}]\} \quad \text{(equation 2)}$$

The repeatable runout average value compensation value RRO_COMP[m][n][i] is derived as follows from the repeatable runout average value RRO_AVG[m][n][i], the compensator transmission characteristics (105) Gc(z), and the drive system and magnetic head support system transmission characteristics (401) Gp(z):

$$RRO\_COMP[m][n][i] = \{1 + Gc(z) \times Gp(z)\} 33\, RRO\_AVG[m][n][i] \quad \text{(equation 3)}$$

Adding the compensation value from equation 3 to the position error signal 116 cancels out the average value of the repeatable runout component (for the relevant measurement zone) contained in the servo signal 108 read from the magnetic disk 101. Furthermore, the repeatable runout average value compensation value determined by the calculation in equation 3 is recorded by the compensation value storing function 113. When data is recorded or reproduced by means of the magnetic head 101 following an indicated track, processing is implemented whereby the compensation value output function 114 reads out the compensation value from the compensation value storing function 113, on the basis of the measurement zone, head and sector information, and adds same to the position error signal 116.

Figure 5:
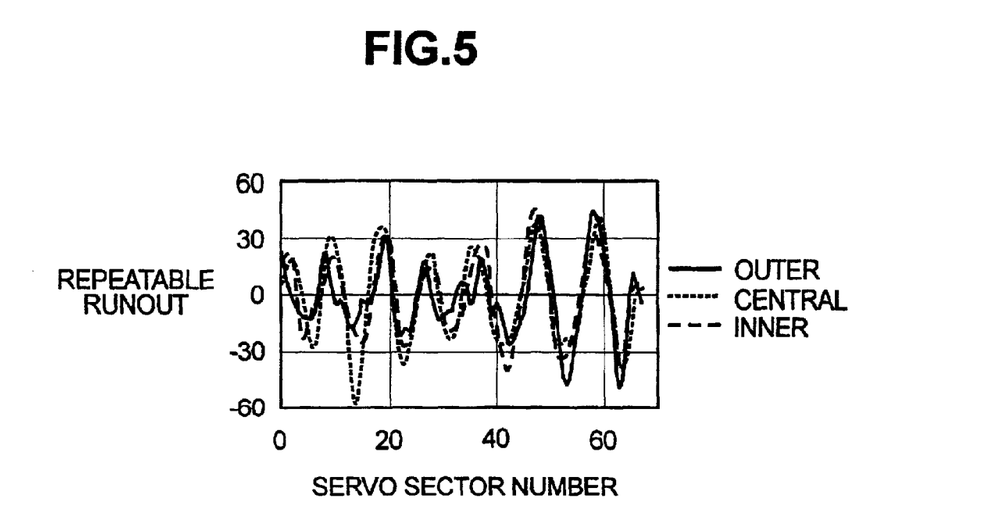
FIG. 5 is a diagram showing example results of repeatable runout measurement in a case where the present invention is not applied.
Figure 6:
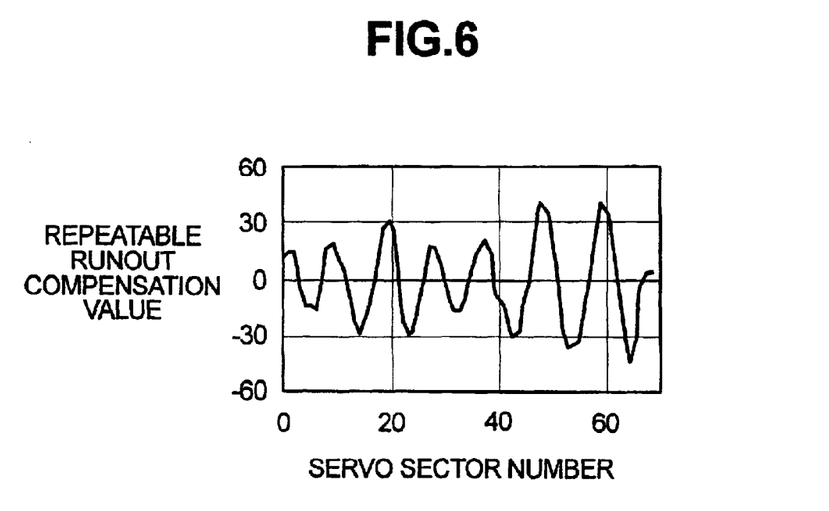
FIG. 6 is a diagram showing calculation results for the compensation value for the average value of repeatable runout.
Figure 7:
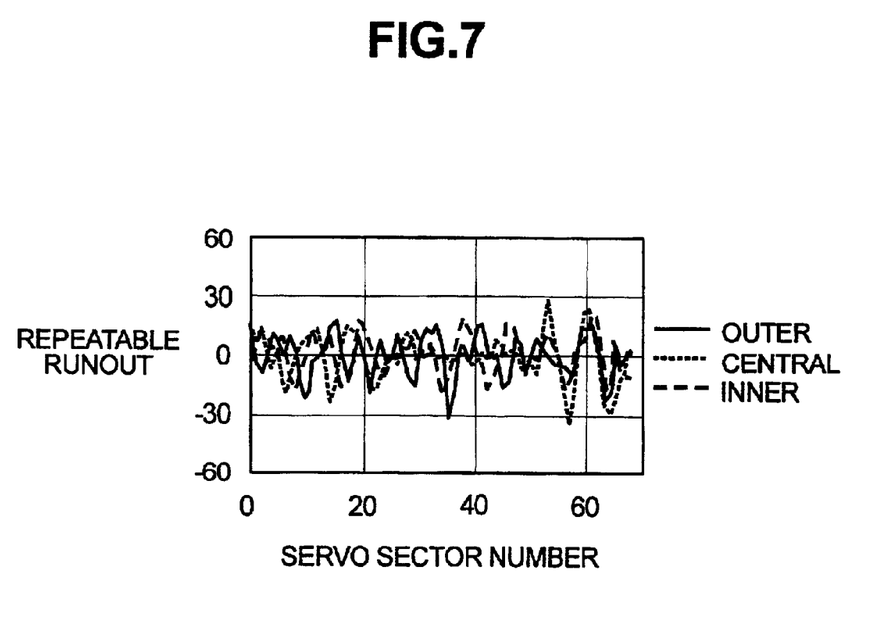
FIG. 7 is a diagram showing servo signal measurement example results in a case where the present invention is not applied.

FIG. 5 illustrates the results of measuring servo information PES_COMP(Z) at the inner, central and outer positions of the measurement zone (1), in the tracking control system in FIG. 4, where the repeatable runout average value compensation signal RRO_COMP[m][n][i] is taken as 0 (in other words, where no compensation is implemented). Moreover, FIG. 6 illustrates a repeatable runout average value compensation signal derived from equation 3. Furthermore, FIG. 7 shows the results of compensating the signal in FIG. 5 by means of the compensation signal in FIG. 6. Positioning accuracy is improved greatly by compensating the average value of the repeatable runout.

Figure 8:
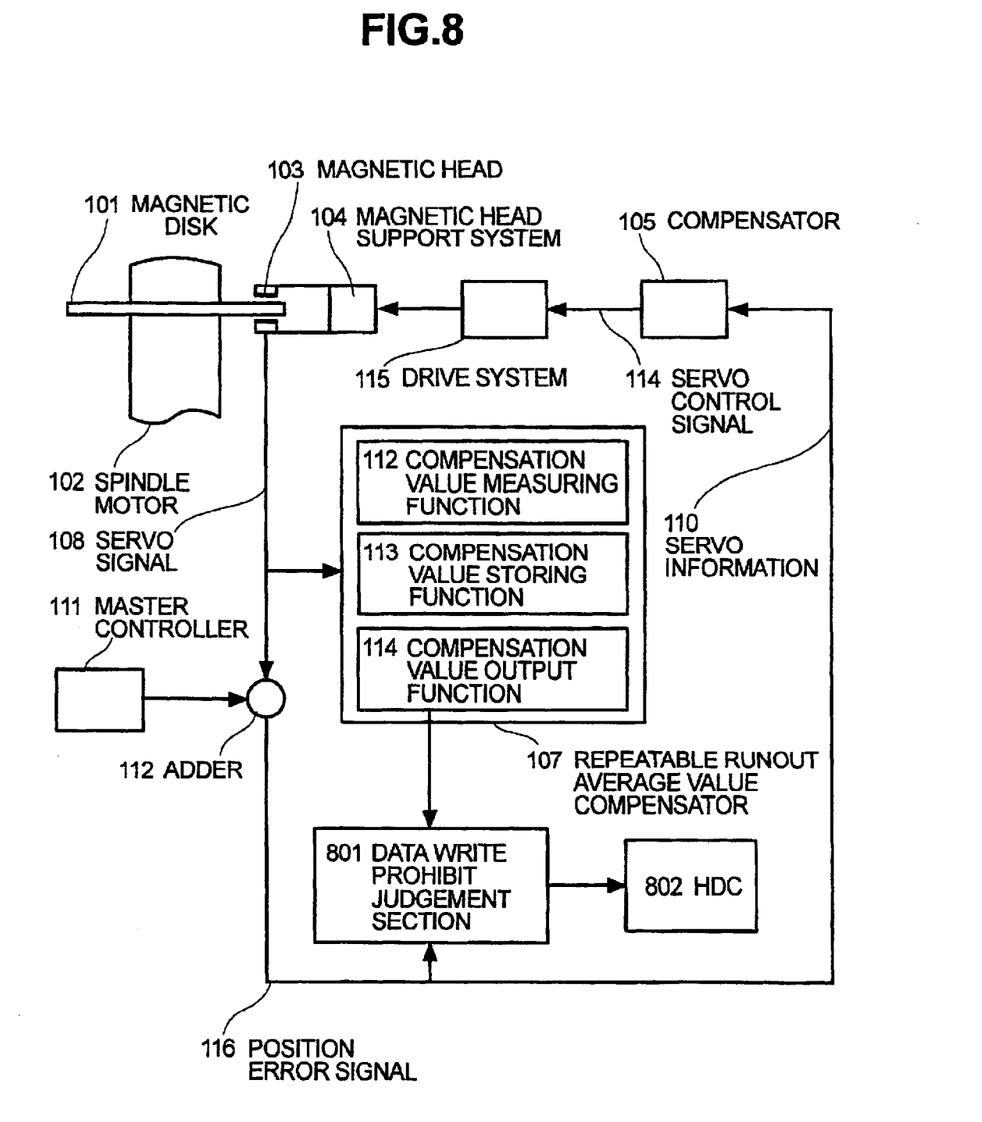
FIG. 8 is a diagram showing a further embodiment.

FIG. 8 shows a further embodiment. This involves functions performing different operations to those in the embodiment shown in FIG. 1. The compensation value measuring function 112 constituting the repeatable runout average value compensator 107 terminates its operation at the calculation of the repeatable runout average value RRO_AVG [m][n][i] in equation (2). This repeatable runout average value RRO_AVG[m][n][i] is then stored in the compensation value storing function 113. Similarly to the embodiment shown in FIG. 1, the compensation signal read out by the compensation value output function 114 is input to a data write prohibit judgement section 801.

In the data write prohibit judgement section 801, a data write prohibit operation is judged, according to the compensation signal read out from the compensation value output function 114 (repeatable runout average value), the position error signal 116, and the data write position error tolerance, and a data write prohibit instruction is sent to the HDC (hard disk controller) 802. Generally, data write prohibit is implemented when the position error signal 116 is greater than a prescribed value, in order to restrict the distance between the central data positions of adjacent tracks to a prescribed distance range. In other words, the data write prohibit judgement section 801 comprises a positioning error slice level used to judge when to suspend data recording if the positioning error is large during data recording, or a function for adjusting the position error information used when performing such judgement. This positioning error slice level is stored previously in a non-volatile memory or on the magnetic disk 101. Furthermore, the positioning error slice level and positioning error information are adjusted for each servo sector.

Here, the repeatable runout average value is the same value between continuous tracks. In other words, the path of the magnetic head 103 with respect to the repeatable runout average value according to the tracking servo system is the same between consecutive tracks. Therefore, in order to maintain the distance between central data positions of adjacent tracks recorded along this path within a prescribed distance range, the data write prohibit off-track amount should be adjusted to following this path. In other words, the data write prohibit off-track amount WF[i] according to the present invention (where i : servo sector number 1~sect) should be set as follows, according to the repeatable runout average value RRO_AVG[m][n][i] (equation 1) and the data write position error tolerance WF_SLICE (a uniform value indicating the tolerated off-track amount when the average repeatable runout value is zero).

$$WF[i] = WF\_SLICE + RRO\_AVG[m][n][i] \quad \text{(equation 4)}$$

The data write prohibit off-track amount WF[i] adjusted in this manner is compared with the position error signal 116 (denoted as PES[i]), and by prohibiting data writing if $$PES[i] > WF[i] \quad \text{(equation 5)}$$

it is possible to restrict the distance between the central positions of data recorded onto adjacent tracks, within a uniform range.

Furthermore, rather than adjusting the data write prohibit off-track amount according to the repeatable runout RRO_AVG[m][n][i] as described above, it is also possible to adjust the position error information to which the data write prohibit off-track amount is compared. In other words, the position error information is adjusted to $$PES\_COMP[i] = PES[i] - RRO\_AVG[m][n][i] \quad \text{(equation 6)}$$

and the data write prohibit judgement condition is set to $$PES\_COMP[i] > WF\_SLICE \quad \text{(equation 7)}$$

Figure 9:
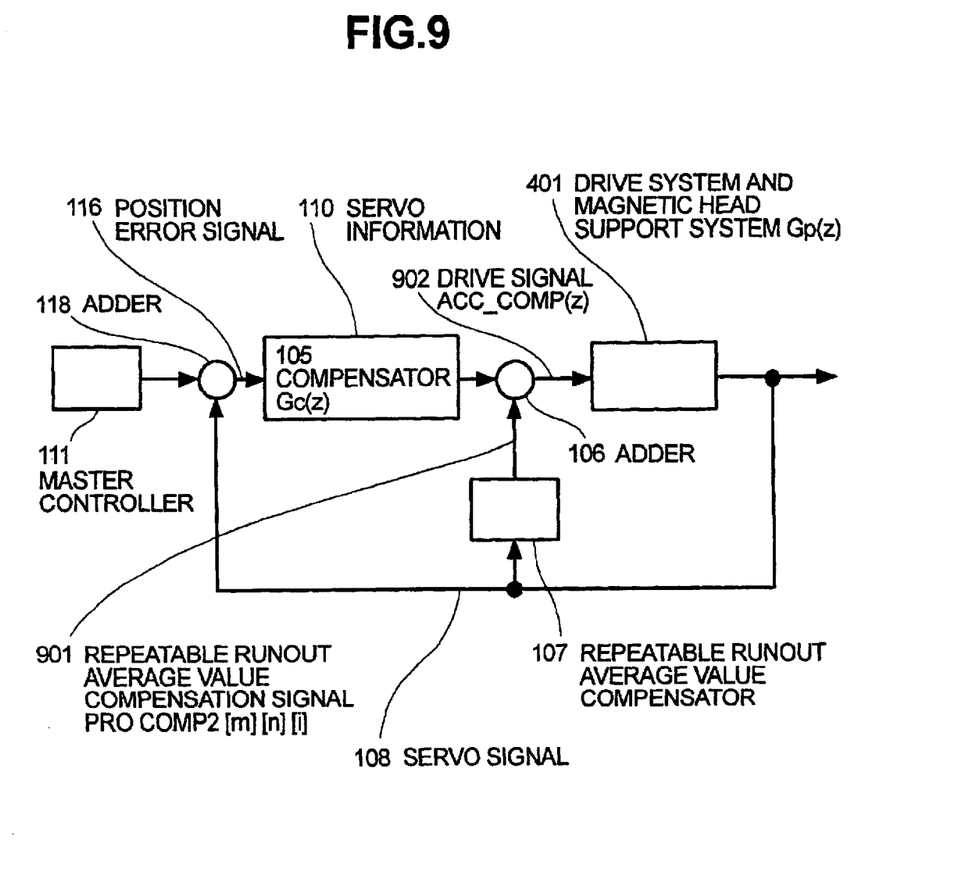
FIG. 9 is a diagram showing yet a further embodiment.

FIG. 9 shows a block diagram of a further embodiment of the present invention. In this embodiment, rather than compensating the servo signal, the average value of the control signal sent to the positioning means is compensated.

The compensator 105 (having transmission characteristics of Gc(z)) derives a servo control signal 117 on the basis of the sum of the servo signal 108 and the target position information instructed by the upper controller 111, as output by the adder 118. Adder 106 then adds a repeatable runout average value compensation signal 901, as read out from the repeatable runout average value compensator 107, to signal 117, to yield a control signal 902, which is used as a basis to control the positioning of the magnetic head support system (the transmission characteristics of the drive system and the head support system being taken as Gp(z) and being represented by a single block 401). Here, z indicates a well-known z transform operator.

The repeatable runout average value compensation signal 901 RRO_COMP2[m][n][i] is determined by (equation 8).

$$RRO\_COMP2[m][n][i] = \{1/Gp(z)\} \times RRO\_AVG[m][n][i] + ACC\_AVG[m][n][i] \quad \text{(equation 8)}$$

ACC_AVG[m][n][i] is the average value of the control signal for each servo sector of a plurality of tracks, and here $$ACC\_AVG[m][n][i] = (1/\text{track}) \times \{ACC[m][n][i][1] + \ldots + ACC[m][n][i][\text{track}]\} \quad \text{(equation 9)}$$

ACC[m][n][i][j] indicates the input to the drive system 401, in other words, the output from the compensator 105, for the (m)th head (m=0~hd−1), nth zone (n=1~zone), (j)th track (j=1~track) and (i)th servo sector (i=1~sect), when no repeatable runout average value compensation is performed. In this embodiment, the magnetic head 103 operates so as to follow the repeatable runout average value. Therefore, the effect of the repeatable runout average value is removed from the servo signal 108 and hence positioning accuracy is improved.

The average value of the drive signal 902 when no repeatable runout average value compensation signal 901 is input is defined as the average control signal.

In each of the foregoing embodiments, the repeatable runout was determined, the average value thereof was derived and a compensation value was calculated, with respect to all sectors, all tracks and all heads, but this is not a mandatory condition. With regard to the heads, the repeatable runout should be determined for at least one of the heads. With regard to tracks, the repeatable runout should be determined and a compensation value calculated, for at least a plurality of tracks in the same sector. With regard to the sectors, similarly, there is no need to determine the repeatable runout for all sectors, and it is possible to calculate a compensation value by, for example, determining the repeatable runout for half the sectors by selecting alternate sectors, or determining the repeatable runout in only three or four positions of one cycle of a track.

According to the present invention, the accuracy of positioning a magnetic head is improved by compensating the average value of the repeatable runout. Therefore, it is possible to improve the positioning accuracy of a magnetic disk drive which utilizes a system where servo information is recorded onto the magnetic disk before installing the magnetic disk on the spindle motor, this system tending to produce particularly notable worsening of positioning accuracy due to the average value of repeatable runout.

What is claimed is:

1. A magnetic disk drive comprising:
    a magnetic disk on which servo information is stored;
    a magnetic head for recording/reproducing information to/from said magnetic disk;
    a driver for positioning said magnetic head over said magnetic disk; and
    a controller for adjusting a positioning error slice level for said magnetic head, for each servo sector, whereby data recording is halted, on the basis of the average value of the repeatable runout for each servo sector in a plurality of tracks of said servo information.

2. The magnetic disk drive according to claim 1, wherein said average value of the repeatable runout is stored in a non-volatile memory or on said magnetic disk.

3. The magnetic disk drive according to claim 1, wherein said positioning error slice level is stored in a non-volatile memory or on said magnetic disk.

* * * * *